United States Patent [19]
Brazell et al.

[11] Patent Number: 5,267,720
[45] Date of Patent: Dec. 7, 1993

[54] STRUCTUREBORNE NOISE ISOLATOR

[75] Inventors: James R. Brazell, Charlottesville; Jamil I. Lahham, Ruckersville, both of Va.

[73] Assignee: Sperry Marine Inc., Charlottesville, Va.

[21] Appl. No.: 809,631

[22] Filed: Dec. 6, 1991

[51] Int. Cl.$^5$ .................................... F16M 1/00
[52] U.S. Cl. ................................ 248/638; 248/618; 248/624
[58] Field of Search ............... 248/638, 603, 604, 618, 248/635, 621, 624, 556

[56] References Cited

U.S. PATENT DOCUMENTS

| | | | |
|---|---|---|---|
| 1,832,368 | 11/1931 | Ell | 248/603 |
| 2,076,699 | 4/1937 | Brown | 248/603 |
| 2,465,790 | 3/1949 | Campbell | 248/556 |
| 2,912,212 | 11/1959 | Lowe | 248/638 X |
| 4,681,293 | 7/1987 | Cucci | 248/603 |
| 4,731,985 | 3/1988 | Menegatto | 248/603 X |
| 4,863,139 | 9/1989 | Grutzmacher | 248/618 |
| 5,040,764 | 8/1991 | Dubois | 248/635 |
| 5,178,357 | 1/1993 | Platus | 248/638 X |

*Primary Examiner*—J. Franklin Foss
*Attorney, Agent, or Firm*—Seymour Levine

[57] ABSTRACT

A structureborne noise isolator employs a two axis system whereby a noise generating platform is coupled to an inner frame by a first pair of diametrically positioned noise isolators, the inner frame being coupled to an outer frame by a second pair of diametrically positioned noise isolators. At least one noise isolator comprising a coil spring shrink fitted at one end to an inner housing and at the other end to a cover. The inner housing is inserted into an outer housing with a damping compound between and potted to the inner and outer housings. Additional damping compound is bonded to the base of the outer housing separating the base of the outer housing from the base of the inner housing. The cover, having damping compound bonded thereto, is coupled to the outer housing. A hub, positioned adjacent to the damping compound on the cover, is coupled to the inner housing.

11 Claims, 4 Drawing Sheets (PRE LOADED)

(PRE LOADED)

STRUCTUREBORNE NOISE ISOLATOR

BACKGROUND OF THE INVENTION

1. Field of the Invention

The invention relates to the field of vibration isolators, and more particularly to apparatus for reducing structureborne noise due to vibrations induced on a platform by a moving mass mounted thereon.

2. Description of the Prior Art

A ring laser gyroscope (RLG) utilizes two monochromatic laser beams propagating in opposite directions about a closed loop. Rotation of the apparatus about the loop axis effectively increases the beam path length in one direction and decreases the beam path in the opposite direction. Since the laser frequencies of the two counter-rotating beams are functions of the lasing path length, the differential path length established by the rotation of the RLG causes a frequency difference between the two beams The magnitude and sign of this frequency difference are representative of the RLG's rate and direction of rotation and may be monitored for these purposes in manners well known in the art. At low rotation rates, the frequency difference between the counter-rotating beams is small and the beams tend to resonate at the same frequency, i.e. lock-in, and the RLG appears to be stationary. This lock-in prevents the RLG from sensing rotation rates that are at or below the lock-in rate. To reduce the lock-in rate, the RLG is mechanically oscillated, dithered, about the its axis to establish rotation in one direction and then the other. Such dithering provides a signal at the output terminals that is substantially independent of the mechanical oscillation while maintaining an apparent rotation in each direction, thus reducing the lock-in rotation rate.

The dithering causes the structure on which the RLG is mounted to vibrate, thereby generating structureborne noise which adversely effects equipment mechanically coupled to the mounting structure. One method of the prior art for reducing structureborne noise is disclosed in U.S. Pat. No. 5,012,174 issued to Charles M. Adkins, et al and assigned to the assignee of the present invention. Adkins, et al teach a device which is attached directly to the RLG platform and electronically establishes counter vibrations of the platform to cancel vibrations induced by the dithering RLG. The apparatus taught by Adkins, et al, however, is complex mechanically and electrically and is too expensive for use with the relatively inexpensive RLG.

SUMMARY OF THE INVENTION

In accordance with the principles of the present invention a structureborne noise isolator comprises a passive, precision machined assembly which includes a high temper steel helical coil spring and high loss damping material in a "jaw like" coupling relationship. The coil spring attenuates the structureborne noise and maintains structure alignment, while the damping material controls excessive deflections of the noise isolator caused by shock and vibration forces imposed on the noise isolator by forces external to the noise isolator. The entire assembly comprises an inner housing, to which the helical coil spring is shrink fitted, a hub, a cover, and an outer housing. The inner housing is inserted into the outer housing and separated from the outer housing by a snubber pad bonded to the base of the outer housing. After insertion of the inner housing into the outer housing, flanges on the inner and outer housing are in a common plane and are alternately positioned with spaces therebetween. A high loss damping compound is potted in the spaces between the flanges. This damping compound increases torsional stiffness and restricts lateral motion. The cover is positioned over the coil spring and coupled to the outer assembly flanges. A second snubber is positioned over the cover and separates the cover from the hub, which is coupled to the flanges of the inner housing.

These noise isolators may be employed, in accordance with the invention, in a two axis system, configured with an inner axis whereat an internal measurement unit (IMU) may be mounted and an outer axis, to isolate the inner axis from the outer axis and to isolate the outer axis from an outer frame to which it is mounted. The isolators in each axis are positioned such that a line connecting the isolators passes through the center of gravity of the isolated mass. This configuration isolates the noise close to the source, thereby reducing the excitation of structural resonances, and prevents the translational disturbances caused by shock and vibration from coupling to rotations of isolated masses. Thus the noise isolator of the present invention provides a significant reduction of structureborne noise transmitted from the mounting platform of the oscillating element.

These and other aspects of the invention will be more fully understood by referring to the following detailed description and the accompanying drawings.

DESCRIPTION OF THE PREFERRED EMBODIMENTS

Figure 1:
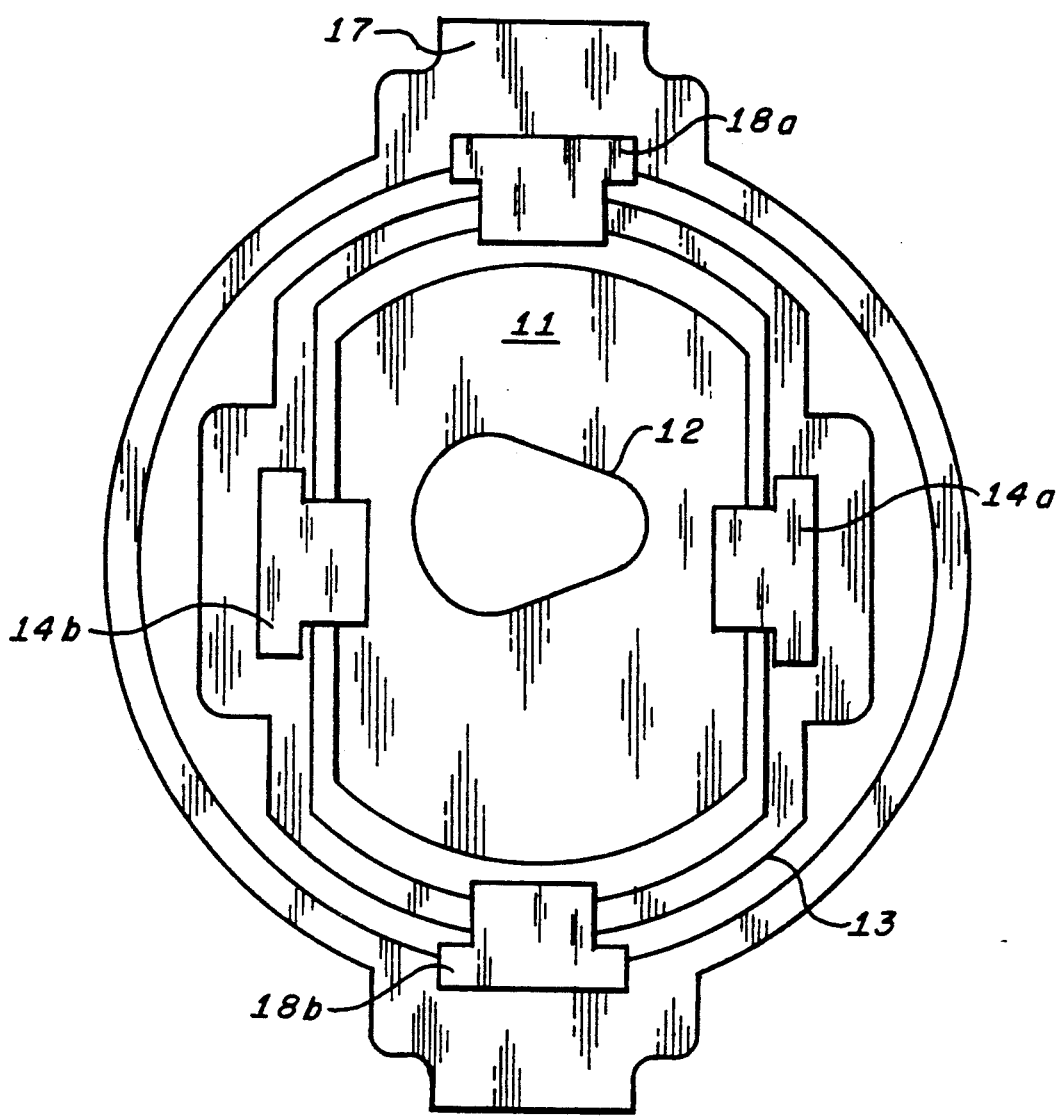
FIG. 1 is a cross-sectional outline drawing of an oscillating element mounted in a two axis system. The positioning of noise isolators to isolate one axis from the other and to isolate the two axes from the mounting frame is clearly indicated in the drawing.

Refer now to FIG. 1. A block 11 having a vibrating or oscillating element 12, as for example a dithering ring laser gyroscope, mounted thereon is mechanically coupled to a roll rotator 13, or inner frame, via identical noise isolators 14a and 14b. The roll rotator 13 in turn is mechanically coupled to a frame 17 via noise isolators 18a and 18b, which are identical to the noise isolators 14a,14b. Movement of the element 12 causes the block 11 to vibrate and generate structure-borne noise. This noise is uncoupled from the roll rotator 13 by the noise isolators 14a,14b in a manner to be subsequently described. The mechanical coupling of the roll rotator 13 to the frame 17 via the noise isolators 18a,18b provides a further reduction of structureborne noise transmitted to the frame 17. This mechanical arrangement isolates the noise close to the source, thereby significantly reducing structure-borne noise transmitted from the block 11 to frame 17 via the roll rotator 13.

Protection of the element 11 from translational disturbances caused by shock and vibrations applied to the frame is provided by positioning the noise isolators 14a,14b and 18a,18b such that a line along the isolator axes connecting each pair passes through the center of gravity of the block 11, element 12, and roll rotator 13 assembly. This arrangement tends to prevent the conversion of the translational disturbances caused by shock vibrations applied to the frame 17 into rotational forces applied to the mounted elements.

Figure 2:
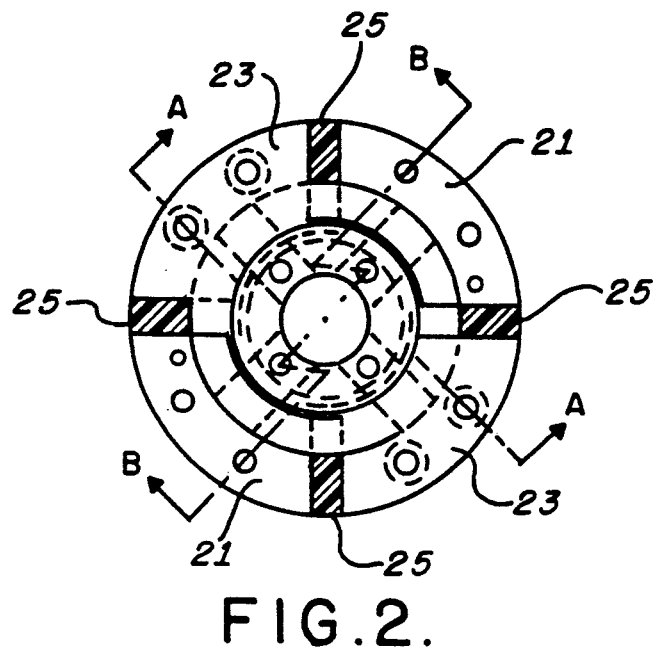
FIG. 2 is a top view of a noise isolator constructed in accordance with the principle of the invention.
Figure 2A:
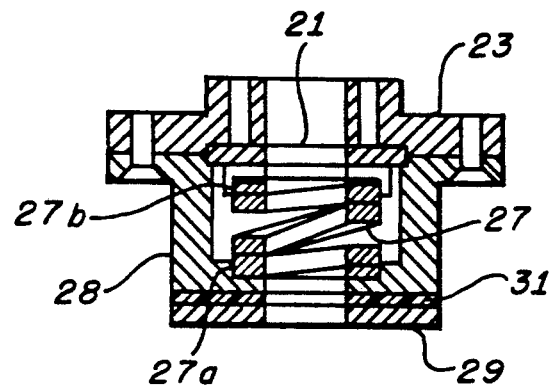
FIG. 2A is a view of the noise isolator in the relaxed state taken through the cross section A—A indicated in FIG. 2.
Figure 2B:
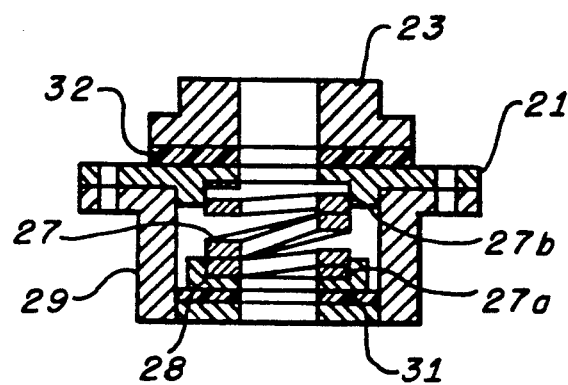
FIG. 2B is a view of the noise isolator in the relaxed state taken through the cross section B—B indicated in FIG. 2.

A noise isolator that may be employed for the noise isolators 14a, 14b, 18a, and 18b may comprise a precision ground coil spring of tempered steel, a precision machined inner housing, a hub, a cover, and an outer housing arranged as shown in FIGS. 2, 2A, and 2B wherein like elements are identified by the same reference numeral. FIG. 2 is a plan view of such an isolator wherein the cover 21 and the hub 23 are shown. Also shown in this figure is a high loss damping compound 25 which is potted between the inner and outer housing at four locations to increase torsional stiffness lacking in the coil spring and to restrict lateral motion due to external vibration and shock. The damping compound 25 may be a polyurethane elastomer such as ISOLOSS provided by EAR Division of Cadot Corporation, located in Indianapolis, Ind.

Greater details of the noise isolator are provided in the cross-sectional views A—A and B—B provided in FIGS. 2A and 2B, respectively. Coil spring 27 is shrink fitted at one end 27a to the inner housing 28 and at the other end 27b to the cover 21. The inner housing 28 is inserted into the outer housing 29, as clearly shown in FIG. 2B, while the cover 21 provides an insert 27b whereat the other end of the spring is shrink fitted, caps the inner housing, and is connected to the outer housing. Layers of damping material 31 and 32, respectively bonded to the base of the outer housing 29 and to the upper surface of the cover 21, act as snubbers to restrict motion along the axis of the coil 27 that may be caused by external shock and vibration. As clearly shown in FIG. 2A, the hub 23 caps the cover 21 and is connected to the inner housing 28. The damping material 31 and 32 may be a thermoplastic such as ISODAMP also provided by EAR Division of Cadot Corpation.

Figure 3A:
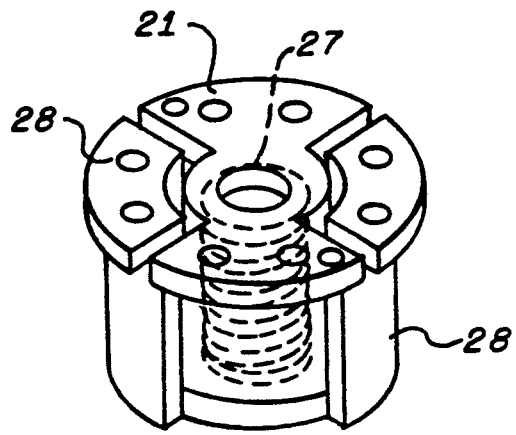
FIG. 3A is a pictorial representation of the springinner housing assembly of the noise isolator.
Figure 3B:
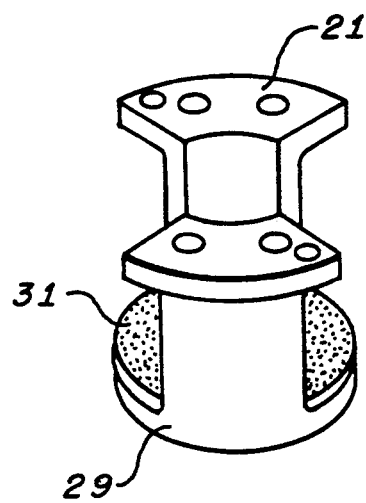
FIG. 3B is a pictorial representation of the outer housing assembly of the noise isolator.
Figure 3C:
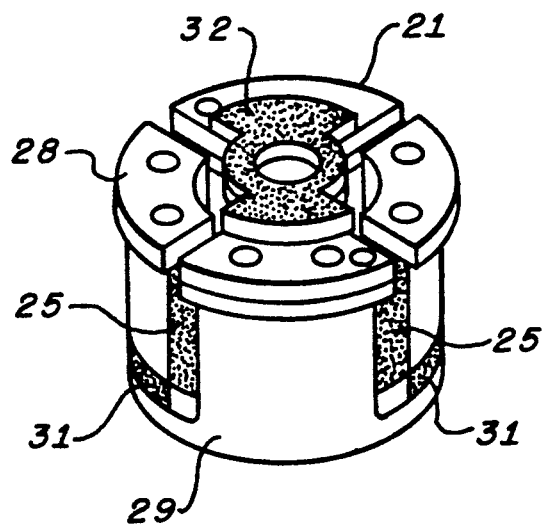
FIG. 3C is a pictorial representation of the noise isolator assembly.

Refer now to FIGS. 3A, 3B, and 3C where pictorial views of the inner housing and coil spring, the outer housing, and an assembly of the noise isolator without the cover and hub are shown, respectively. In FIG. 3A the coil spring 27 is shown fitted into the base of the inner housing 28 and into the cover 21. FIG. 3B clearly shows the outer housing 29 with the snubber 31 located at the base. The assembly of the inner housing 28 and outer housing 29 with the damping material 25 inserted therebetween is shown in FIG. 3C. Also shown is the damping material 32 capping the cover 21. This damping provides additional snubbing action to further restrict action along the axis of the coil spring 27 due to external shock and vibration.

Figure 4A:
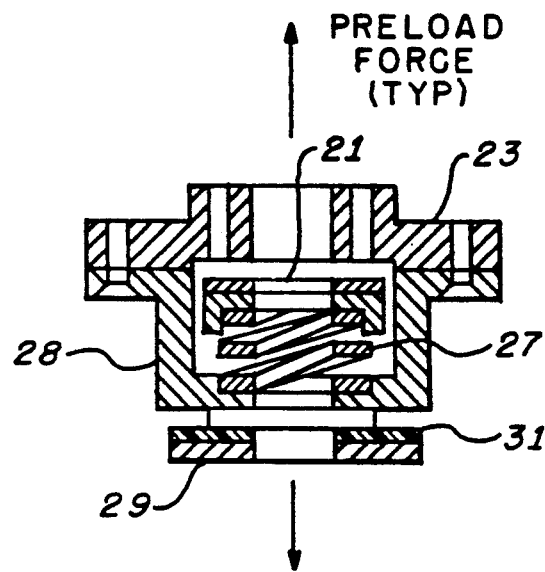
FIG. 4A is a view of the noise isolator in the preloaded state taken through the cross section A—A indicated in FIG. 2.
Figure 4B:
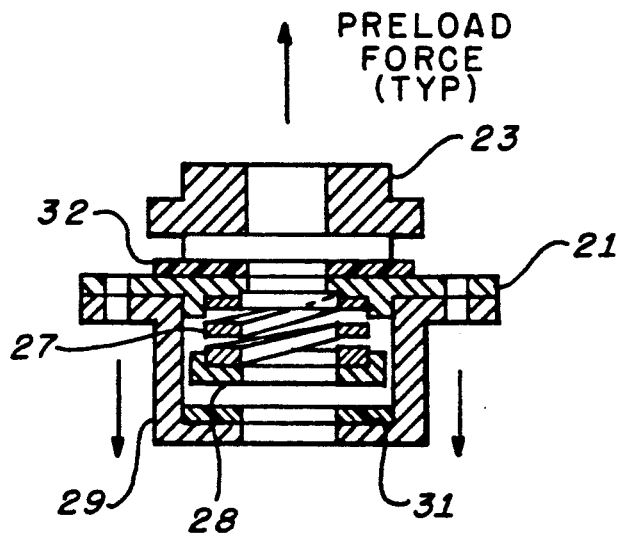
FIG. 4B is a view of the noise isolator in the preloaded state taken through the cross section B—B indicated in FIG. 2.

In the relaxed state, shown in FIGS. 2A and 2B, the inner housing 28 and the hub 23 are, respectively in contact with the snubber pads 31 and 32. Those skilled in the art should recognize that the noise isolators 14a, 14b, 18a, and 18b (FIG. 1) cannot attenuate noise in this state. This situation is rectified by preloading the isolators when an isolator pair is installed. Preloading is accomplished by sufficiently compressing the coil springs 27 to eliminate contact of the snubbers With the inner housing and the hub. After preloading, the block 11 is floating on the roll rotator 13 and the roll rotator 13 is floating on the frame 17. Each isolator configuration after preloading is as shown in FIGS. 4A and 4B.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. An apparatus for providing structureborne noise isolation between a platform assembly having a center of gravity; an outer frame; an inner frame; first pair of isolators positioned between said platform and said inner frame along a first common axis in a manner to couple said platform to said inner frame; and a second pair of isolators positioned between said inner frame and said outer frame along a second common axis to couple said inner frame to said outer frame; wherein at least one of said isolators comprises:

an inner housing having a base;
   a spring having one end thereof bonded to said base of said inner housing;
   an outer housing having a base, said inner housing inserted in said outer housing with said base of said inner housing adjacent said base of said outer housing;
   a cover having one surface bonded to an end of said spring opposite said one end and coupled to said outer housing; and
   a hub having a base adjacent a surface of said cover opposite said one surface and coupled to said inner housing.

2. An apparatus in accordance with claim 1 wherein said first and second pairs of isolators are positioned such that said first and second common axes pass through said center of gravity.

3. An apparatus in accordance with claim 1 wherein said coil spring is bonded to said inner housing and said cover by shrink fitting.

4. An apparatus in accordance with claim 1 further including:

a first snubber positioned between said base of said hub and said cover; and
   a second snubber positioned between said base of said inner housing and said base of said outer housing.

5. An apparatus in accordance with claim 4 further including a high loss damping compound inserted between said inner housing and said outer housing.

6. An apparatus in accordance with claim 5 wherein said coil spring is bonded to said inner housing and said cover by shrink fitting.

7. A noise isolator comprising:

an inner housing having a base;
   a coil spring having one end thereof bonded to said base of said inner housing;

an outer housing having a base, said inner housing inserted in said outer housing with said base of said inner housing adjacent said base of said outer housing;

a cover having one surface bonded to an end of said coil spring opposite said one end and coupled to said outer housing; and a hub having a base adjacent a surface of said cover opposite said one surface and coupled to said inner housing.

8. An apparatus in accordance with claim 7 herein said coil spring is bonded to said inner housing and said cover by shrink fitting.

9. An apparatus in accordance with claim 7 further including:

first snubber positioned between said base of said hub and said cover; and a second number positioned between said base of said inner housing and said base of said outer housing.

10. An apparatus in accordance with claim 9 further including a high loss damping compound inserted between said inner housing and said outer housing.

11. An apparatus in accordance with claim 10 wherein said coil spring is bonded to said inner housing and said cover by shrink fitting.

* * * * *